Patented Feb. 25, 1947

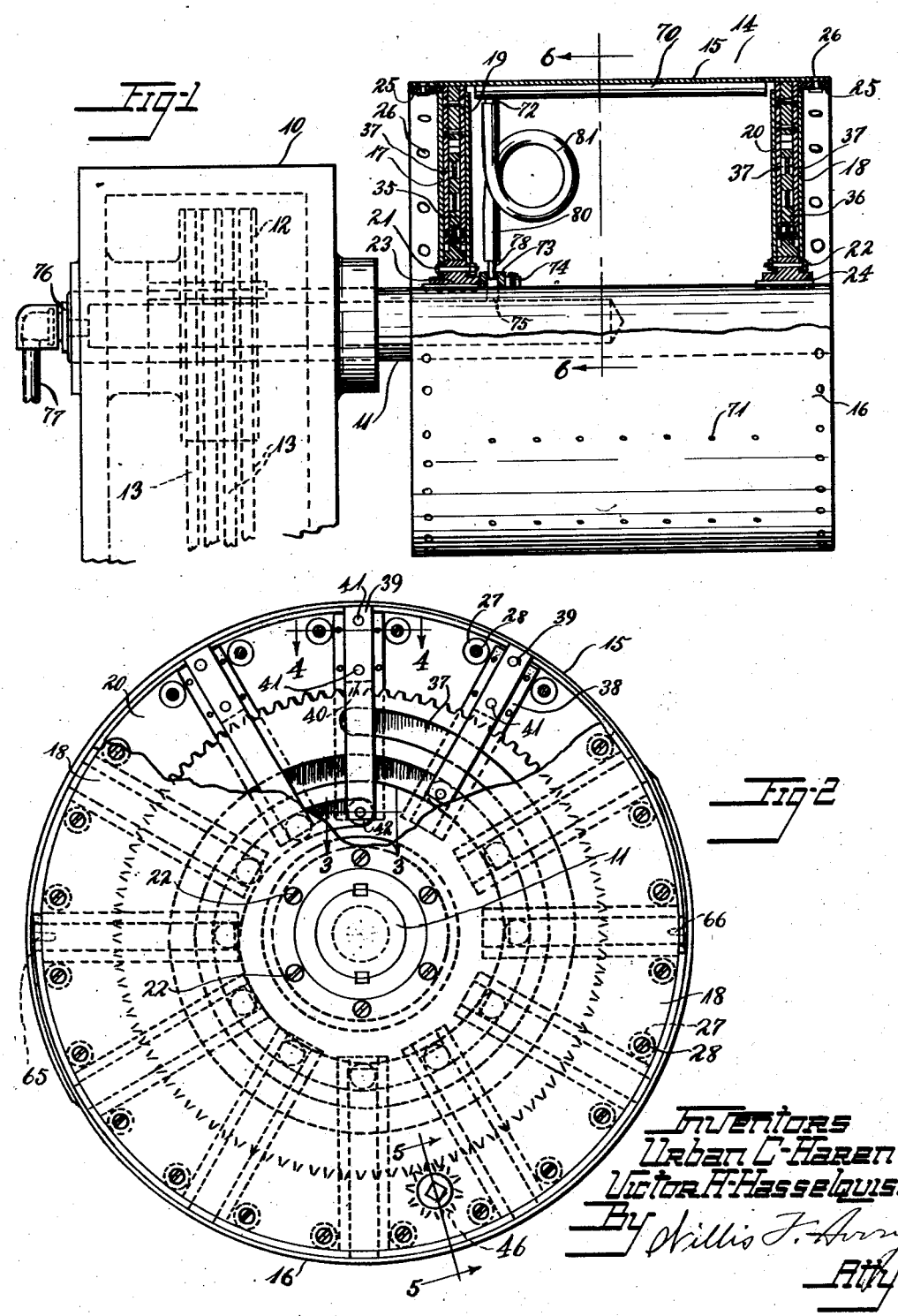

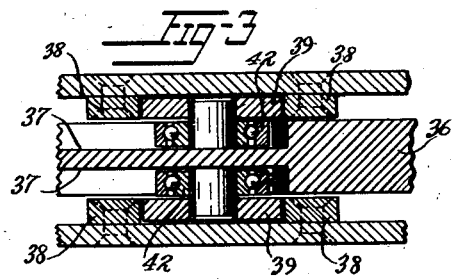
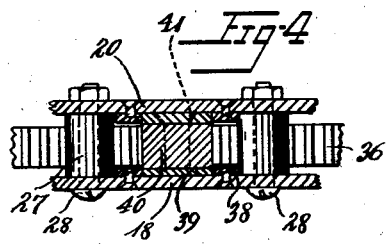
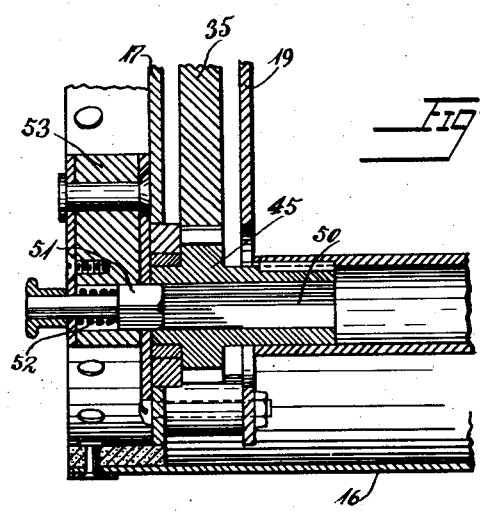
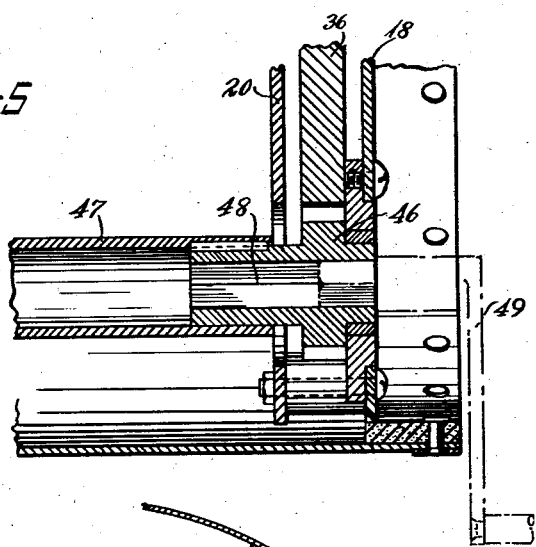
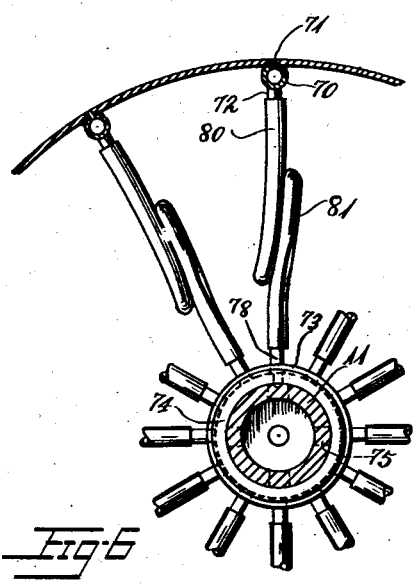
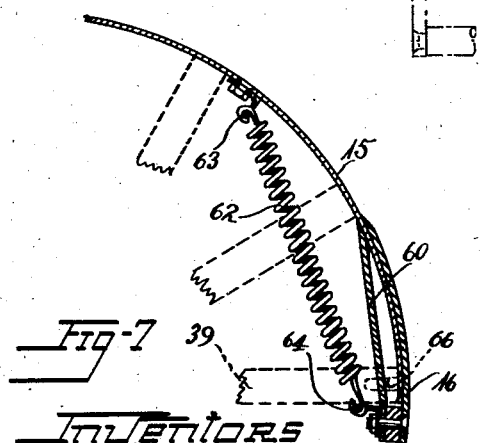

2,416,523

UNITED STATES PATENT OFFICE 2,416,523

EXPANSIBLE BAND-BUILDING DRUM

Urban C. Haren and Victor H. Hasselquist, Akron, Ohio, assignors to The B. F. Goodrich Company, New York, N. Y., a corporation of New York Application September 1, 1944, Serial No. 552,308

2 Claims. (Cl. 154—9)

This invention relates to band-building drums for use in preparing bands of material for making tires and other articles and is particularly useful where endless bands of a considerable range of sizes are desired.

In the building of pneumatic tire casings strips of sheet material such as cord fabric or weftless cords have been laid without tension about a cylindrical drum and have been spliced to desired size thereon. The endless bands have then been removed endwise from the band-building drum and stored for subsequent use by the tire builder.

The principal objects of this invention are to provide a band building drum having adjustment of its circumference over a wide range to provide for building a range of sizes of band on a single drum and at the same time to provide means for quickly removing the band without requiring collapse of the drum, to provide ease of adjustability, and to provide quick-acting adjustment.

These and other objects will appear from the following description and the accompanying drawings.

Of the drawings,

Fig. 1 is a side elevation of a drum made in accordance with and embodying the invention mounted upon a driving unit, parts being broken away and parts shown in section, Fig. 2 is an end elevation of the drum, parts being broken away and parts shown in section, Fig. 3 is a detail sectional view taken on line 3—3 of Fig. 2, Fig. 4 is a detail sectional view taken on line 4—4 of Fig. 2, Fig. 5 is a detail sectional view taken on line 5—5 of Fig. 2, Fig. 6 is a sectional view taken on line 6—6 of Fig. 1, parts being broken away, and Fig. 7 is a detail sectional view of the shell tensioning mechanism.

Referring to the drawings, the numeral 10 designates a supporting and driving unit having a rotatable hollow shaft 11 journaled therein. A pulley 12 is fixed to the shaft and is adapted to be driven by belts 13 from any desired source of power such as an electric motor (not shown). The shaft 11 extends horizontally to support and rotate the band building drum 14.

Supported about the shaft 11 and spaced radially therefrom are a pair of semicircular shell sections 15, 16 arranged with their ends overlapping each other to provide an adjustable drum surface. The shell sections are of flexible sheet metal and are supported from the shaft 11 at their position of smallest adjusted dimension by axially spaced apart discs 17, 18. These discs together with similar discs 19, 20 spaced axially therefrom by spacers 27 and bolts 28, respectively, for a purpose hereinafter described, are secured by bolts 21, 22 to collars 23, 24 in turn fixed to the shaft 11. Cushioning engagement of the shell sections 15, 16 with the perimeters of the discs 17, 18 is provided by strips of leather 25 secured to the inner faces of the shell sections by rivets 26.

For expanding the shell to larger dimensions, a pair of gears 35, 36 are rotatably mounted about the collars 23, 24 respectively, the gear 35 between the discs 17, 19 and the gear 36 between discs 18 and 20. Each gear has spiral scroll slots such as 37 in its opposite side faces. Radial guide strips 38 are fixed to the discs and define radial grooves in which radial arms 39 are slideably mounted. Opposite arms are fixed together beyond the gears by spacing blocks 40 and rivets 41. The arms have antifriction rollers 42 pinned thereto to engage in the scroll slots. The arrangement is such that rotation of the gears in one direction extends the arms radially and in the opposite direction retracts them.

For rotating the gears, a pair of pinions 45, 46 are rotatably journaled in the plates 17, 18 and are connected together by a hollow shaft 47 to which they are fixed. The pinions 45, 46 are arranged to mesh with gears 35, 36 respectively. Pinion 46 has a square bore 48 for engaging the squared shank of a removable crank 49 whereby the pinions and shaft 47, and with them gears 35, 36 are rotated. Pinion 45 also has a square bore 50. A spring-pressed locking pin 51 is slidably mounted in a block 53 secured to disc 17 whereby it may be axially withdrawn from the gear 45 when adjustments are to be made. It is returned by its spring 52.

As shown in Fig. 7, the end of shell section 16 which overlaps an end of shell section 15 has a plate 60 fixed thereto and extending under the end of plate 15 to retain the ends of the shell members in sliding relation. An extension coil spring 62 has one end fixed to shell section 15 at a distance from the end of the section, as at 63, and its other end is fixed as at 64 to shell section 16. The other ends of the shell sections are similarly provided with guides and coil springs for the purpose of retracting the sections when the radial arms are retracted. The radial arms adjacent the leading ends of the sections are secured to the section as at 65, 65, respectively, to limit rotation of the shell structure with relation to the radial arms.

To provide for quick removal of the bands from the drum irrespective of adjustment, axially extending pipes 70, having closed ends are welded to the shell sections at spaced intervals and apertures 71 are formed through the shell section connecting with the pipes. Each pipe has a branch nipple 72 secured thereto. A hollow collar 73 of channel cross section is rotatably mounted about shaft 11 and held in place by a stop collar 74 and collar 23 against axial movement. Its channel is connected by apertures 75 through shaft 11 with the hollow interior of the shaft. A swivel pipe connection 76 connects a stationary pipe 77 with an open end of shaft 11. Each pipe 70 is connected to a nipple 78 communicating with the channel of collar 73 by a flexible hose 80 having a slack loop 81 which permits movement of the shell sections both radially and circumferentially with respect to the shaft 11. The arrangement is such that at any adjusted position of the shell sections, a finished band may be removed from the drum by admitting air under pressure to the face of the shell sections so that the band may be removed while cushioned on the air film between it and the drum surface.

The operation of the drum is as follows: With the stop pin 51 withdrawn and the crank 49 inserted in the bore of gear 46, the crank is rotated and with it gears 35, 36 are turned to move the arms 39 radially to adjust the shell to the desired size. The crank is then withdrawn and the pin 51 returned to locking position. Sheet material is laid about the drum and spliced in endless form. The air under pressure is then admitted through pipe 77 to the apertures 71 where it forms a film of compressed air between the finished band and the drum face to lift the band therefrom. The band is removed axially of the drum.

Variations may be made without departing from the scope of the invention as it is defined by the following claims.

We claim:

1. A band-building drum comprising a plurality of circumferentially overlapping shell sections providing a continuous band-supporting surface, a rotatable support for said sections, means for simultaneously moving said sections radially of said support to adjust the diameter of the drum concentrically throughout a range to suit bands of different diameters, said sections each being provided with perforations for discharging fluid under pressure from their peripheral surfaces for removing bands from the drum, and extensible means for conducting fluid under pressure from said support to said sections at all positions of diametrical adjustment thereof.

2. A band-building drum comprising a plurality of circumferentially overlapping shell sections providing a continuous band-supporting surface, a rotatable support for said sections, means including a scroll cam for simultaneously moving said sections radially of said support to adjust the diameter of the drum concentrically throughout a range to suit bands of different diameters, said sections each being provided with perforations for discharging fluid under pressure from their peripheral surfaces for removing bands from the drum without disturbing its adjustment, and extensible means for conducting fluid under pressure from said support to said sections at all positions of diametrical adjustment thereof.

URBAN C. HAREN.
VICTOR H. HASSELQUIST.

REFERENCES CITED

The following references are of record in the file of this patent:

UNITED STATES PATENTS

| Number | Name | Date |
|---|---|---|
| 1,731,817 | Hudson | Oct. 15, 1929 |
| 2,132,324 | Schrank | Oct. 4, 1938 |
| 2,053,815 | De Panthou et al. | Sept. 8, 1936 |

FOREIGN PATENTS

| Number | Country | Date |
|---|---|---|
| 395,668 | French | Jan. 5, 1909 |